US010472506B2

(12) United States Patent
Zhang et al.

(10) Patent No.: US 10,472,506 B2
(45) Date of Patent: Nov. 12, 2019

(54) HALOGEN-FREE FLAME RETARDANT COMPOSITIONS WITH IMPROVED TENSILE PROPERTIES

(71) Applicant: Dow Global Technologies LLC, Midland, MI (US)

(72) Inventors: Yichi Zhang, Collegeville, PA (US); Marcio Teixeira Alves, Campinas (BR); Bharat I. Chaudhary, Princeton, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/069,223

(22) PCT Filed: Jan. 31, 2017

(86) PCT No.: PCT/US2017/015716

§ 371 (c)(1),
(2) Date: Jul. 11, 2018

(87) PCT Pub. No.: WO2017/151256

PCT Pub. Date: Sep. 8, 2017

(65) Prior Publication Data

US 2019/0031868 A1 Jan. 31, 2019

Related U.S. Application Data

(60) Provisional application No. 62/301,097, filed on Feb. 29, 2016.

(51) Int. Cl.

| | |
|---|---|
| ***H01B 7/00*** | (2006.01) |
| ***C08L 23/08*** | (2006.01) |
| ***C08L 23/26*** | (2006.01) |
| ***C08K 3/016*** | (2018.01) |
| ***C08L 33/06*** | (2006.01) |
| ***H01B 3/44*** | (2006.01) |
| ***H01B 7/295*** | (2006.01) |

(52) U.S. Cl.

CPC .......... *C08L 23/0869* (2013.01); *C08K 3/016* (2018.01); *C08L 23/0807* (2013.01); *C08L 23/0846* (2013.01); *C08L 23/26* (2013.01); *C08L 33/06* (2013.01); *H01B 3/441* (2013.01); *H01B 7/295* (2013.01); *C08L 2201/02* (2013.01); *C08L 2201/08* (2013.01); *C08L 2203/202* (2013.01); *C08L 2205/025* (2013.01); *C08L 2205/03* (2013.01)

(58) Field of Classification Search

CPC .. H01B 7/02; H01B 7/04; H01B 7/295; C08L 23/26; C08L 33/06

USPC ... 174/110 R, 113 R, 120 R, 120 SR, 121 R, 174/121 SR

See application file for complete search history.

(56) References Cited

U.S. PATENT DOCUMENTS

| | | | | |
|---|---|---|---|---|
| 4,871,787 A | | 10/1989 | Yamamoto et al. | |
| 5,378,539 A | * | 1/1995 | Chen | C08K 3/22 174/113 R |
| 5,707,732 A | * | 1/1998 | Sonoda | C08L 23/0815 385/128 |
| 5,889,087 A | | 3/1999 | Hayashi et al. | |
| 6,232,377 B1 | * | 5/2001 | Hayashi | C08K 3/24 524/100 |
| 7,964,663 B2 | | 6/2011 | Gau et al. | |
| 8,618,207 B2 | | 12/2013 | Sultan et al. | |
| 2010/0101822 A1 | | 4/2010 | Bunker et al. | |
| 2015/0093529 A1 | | 4/2015 | Fujita et al. | |

FOREIGN PATENT DOCUMENTS

| | | |
|---|---|---|
| CN | 102952321 A | 3/2013 |
| WO | 2014046165 A1 | 3/2014 |

OTHER PUBLICATIONS

PCT/US2017/015716, International Search Report and Written Opinion dated Mar. 31, 2017.

PCT/US2017/015716, International Preliminary Report on Patentability dated Sep. 4, 2018.

* cited by examiner

*Primary Examiner* — William H. Mayo, III

(57) ABSTRACT

A composition for use in jacketing or insulation materials that has from 42 to 54 percent by weight of a halogen-free flame retardant, from 26 to 46 percent by weight of an ethylene alkyl acrylate copolymer, such as ethylene ethyl acrylate, optionally from 0 to 15 percent by weight of an ethylene-based polymer, optionally from 0 to 12 percent by weight of a coupling agent, and optionally from 0 to 1 percent by weight of an antioxidant. A cable insulation layer, a cable protective outer jacket, a cable core sheath, and cable may include the jacketing material composition.

13 Claims, No Drawings

HALOGEN-FREE FLAME RETARDANT COMPOSITIONS WITH IMPROVED TENSILE PROPERTIES

REFERENCE TO RELATED APPLICATIONS

The present application claims the benefit of U.S. Provisional Application No. 62/301,097, filed on Feb. 29, 2016.

FIELD OF THE DISCLOSURE

The present disclosure relates to jacketing or insulation materials. Specifically, the disclosure relates to jacketing or insulation materials for wire and cable comprising, among other things, a halogen-free flame retardant and an ethylene alkyl acrylate copolymer in which the alkyl groups can have from 1 to 8 carbon atoms, or from 1 to 4 carbon atoms. In an embodiment, the ethylene alkyl acrylate copolymer is ethylene ethyl acrylate. The disclosure further relates to a composition for use in jacketing or insulation materials that exhibits balanced and improved melt rheological, tensile and flame-retardant properties.

BACKGROUND OF THE DISCLOSURE

Polyolefin resins are commonly used as a material in the sheath layers of wires and cables, e.g., the insulation or outer jacket surrounding the wire or cable. Additives are commonly blended with the polyolefin resins to impart flame retardancy to these sheath layers. Typical additives include organic halogenated compounds and flame retardant synergists, such as antimony trioxide. Unfortunately, these additives can cause smoking and/or the emission of harmful gases when subjected to burning. These additives can also cause metals to corrode.

To address these issues, the halogenated flame retardant is often replaced with a non-halogenated or halogen-free flame retardant, such as a metal hydroxide. While addressing the smoking and harmful gas issues, the use of halogen-free flame retardants has some undesired effects. One issue with halogen-free flame retardants is that a relatively larger amount of flame retardant filler is required to achieve the same level of flame retardance as that achieved when using a halogenated flame retardant. The higher content of halogen-free flame retardant can adversely affect the polyolefin resin in terms of melt extrudability, mechanical properties, flexibility, and low temperature performance. In particular, with ethylene vinyl acetate copolymer-based compositions, the higher content of halogen-free flame retardant causes the melt viscosity to increase and tensile elongation to decrease, both of which are undesirable.

Therefore, halogen-free flame retardant compositions with balanced and improved melt rheological, tensile, and flame-retardant properties are desirable.

SUMMARY OF THE DISCLOSURE

A composition for use in jacketing or insulation materials is disclosed, the composition comprising from 42 to 54 percent by weight ("weight percent" or "wt %") of a halogen-free flame retardant, from 26 to 46 percent by weight of an ethylene alkyl acrylate copolymer, optionally from 0 to 15 percent by weight of an ethylene-based polymer, optionally from 0 to 12 percent by weight of a coupling agent, and optionally from 0 to 1 percent by weight of an antioxidant, where all weight percentages are based on the total weight of the composition. In an embodiment, the ethylene alkyl acrylate copolymer is ethylene ethyl acrylate ("EEA").

The halogen-free flame retardant is selected from the group consisting of metal hydroxides, calcium carbonate, and combinations thereof. Further, the ethylene-based polymer is not an ethylene alkyl acrylate copolymer and comprises subunits derived from $C_3$ through $C_{12}$ α-olefins. Still further, the coupling agent is a maleic anhydride grafted polymer. Even further, the antioxidant is selected from the group consisting of hindered and semi-hindered phenols, phosphites and phosphonites, thio compounds, siloxanes, amines, and combinations thereof. Further, the composition additionally comprises one or more other additives.

A cable insulation layer is also disclosed, the cable insulation layer comprising the composition of the first aspect. Further, a cable protective outer jacket is disclosed, the cable protective outer jacket comprising the composition of the first aspect. Still further, a cable core sheath is disclosed, the cable core sheath comprising the composition of the first aspect. Even further, a cable is disclosed, the cable comprising an electrical conductor and a communications media, wherein at least one of the electrical conductor and communications media is surrounded by a sheath comprising the composition of the disclosure.

DETAILED DESCRIPTION OF THE DISCLOSURE

The numerical ranges in this disclosure include all values from and including the lower and the upper values, in increments of one unit, provided that there is a separation of at least two units between any lower value and any higher value. For example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, melt index, polydispersity or molecular weight distribution (Mw/Mn), percent comonomer, and the number of carbon atoms in a comonomer.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Blend", "polymer blend", and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates.

"Cable" and like terms mean at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 5,889,087, 6,496,629, and 6,714,707.

"Sheath" and like terms mean a protective wrapping, coating or other enveloping structure, usually polymeric in composition, about one or more wires or optical fibers. Insulations are sheaths typically designed to protect to wires and/or optical fibers, or bundles of wires and/or optical fibers, from water and static electricity. Insulations are usually, but not always, an interior component of a cable. Jackets are outer or protective sheaths typically designed as the outermost layer of a cable to provide the other components of the cable protection from the environment and physical insult. Outer jackets may also provide protection against static electricity. In some embodiments, one sheath functions both as an insulation and jacket.

"Core" and like terms mean one or more wire or optical fiber, usually a bundle of wire and/or optical fibers, within a single sheath and that forms a central component of a cable. Each wire, optical fiber and/or bundle of wire and/or optical fiber within a core can be bare or enveloped with its own sheath.

Density is determined in accordance with American Society for Testing and Materials (ASTM) procedure ASTM D792-00, Method B.

Melt index ($I_2$) in g/10 min, is measured using ASTM D-1238-04 (version C), Condition 190C/2.16 kg. The notation "$I_{10}$" refers to a melt index, in g/10 min, measured using ASTM D-1238-04, Condition 190C/10.0 kg. The notation "$I_{21}$" refers to a melt index, in g/10 min, measured using ASTM D-1238-04, Condition 190C/21.6 kg. Polyethylene is typically measured at 190° C. while polypropylene is typically measured at 230° C.

Differential Scanning calorimetry ("DSC") is performed using a TAI model Q1000 DSC equipped with an RCS cooling accessory and an auto-sampler. The apparatus is purged with a nitrogen gas flow (50 cc/min). The sample is pressed into a thin film and melted in the press at about 175° C. and then air-cooled to room temperature (~25° C.). Material (3-10 mg) is then cut into a 3 mm diameter disk, accurately weighed, placed in a light aluminum pan (ca 50 mg), and then crimped shut. The thermal behavior of the sample is investigated with the following temperature profile. The sample is rapidly heated to 180° C. and held isothermally for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

As discussed above, a composition for use in jacketing or insulation materials is disclosed, the composition comprising, among other things, a halogen-free flame retardant, an ethylene alkyl acrylate copolymer, an ethylene-based polymer, a coupling agent, and an antioxidant.

The halogen-free flame retardant of the disclosed composition can inhibit, suppress, or delay the production of flames. Examples of the halogen-free flame retardants suitable for use in compositions according to this disclosure include, but are not limited to, metal hydroxides, red phosphorous, silica, alumina, titanium oxide, carbon nanotubes, talc, clay, organo-modified clay, calcium carbonate, zinc borate, antimony trioxide, wollastonite, mica, ammonium octamolybdate, frits, hollow glass microspheres, intumescent compounds, expanded graphite, and combinations thereof. In an embodiment, the halogen-free flame retardant can be selected from the group consisting of aluminum hydroxide, magnesium hydroxide, calcium carbonate, and combinations thereof.

The halogen-free flame retardant can optionally be surface treated (coated) with a saturated or unsaturated carboxylic acid having 8 to 24 carbon atoms, or 12 to 18 carbon atoms, or a metal salt of the acid. Exemplary surface treatments are described in U.S. Pat. Nos. 4,255,303, 5,034,442, 7,514,489, US 2008/0251273, and WO 2013/116283. Alternatively, the acid or salt can be merely added to the composition in like amounts rather than using the surface treatment procedure. Other surface treatments known in the art may also be used including silanes, titanates, phosphates and zirconates.

Commercially available examples of halogen-free flame retardants suitable for use in compositions according to this disclosure include, but are not limited to APYRAL™ 40CD available from Nabaltec AG, MAGNIFIN™ H5 available from Magnifin Magnesiaprodukte GmbH & Co KG, and combinations thereof.

The halogen-free flame retardant can be present in the composition in an amount of at least 42, or at least 43, or at least 44, or at least 45, or at least 46, or at least 47, wt % based on the entire weight of the composition. The maximum amount of halogen-free flame retardant present in the composition typically does not exceed 54 or does not exceed 53 or does not exceed 52 or does not exceed 51 or does not exceed 50 or does not exceed 49, wt % based on the entire weight of the composition.

The ethylene alkyl acrylate copolymer of the disclosed composition is one in which the alkyl groups can have from 1 to 8 carbon atoms, or from 1 to 4 carbon atoms. In an embodiment, the ethylene alkyl acrylate copolymer is ethylene ethyl acrylate ("EEA"). The EEA copolymer of the disclosed composition is a copolymer resin comprising units derived from ethylene and ethyl acrylate. Suitable EEAs can be prepared, for example, using a conventional high pressure process and a free radical initiator, e.g., an organic peroxide, at a temperature in the range of 150 to 350° C. and a pressure of 100 to 300 MPa. The amount of units derived from ethyl acrylate, i.e., the comonomer, present in EEA can be at least 5, or at least 10, wt % based on the weight of the copolymer. The maximum amount of units derived from ethyl acrylate present in the copolymer typically does not exceed 40, or does not exceed 35, wt % based on the weight of the copolymer. The EEA can have a melt index ($I_2$) in the range of 0.5 to 50 g/10min. Commercially available examples of EEA copolymer resins suitable for use in compositions according to this disclosure include, but are not limited to, the AMPLIFY™ EA polymers available from The Dow Chemical Company, for example AMPLIFY™ EA 100, AMPLIFY™ EA 101, AMPLIFY™ 102, AMPLIFY™ EA 103, and combinations thereof.

The EEA copolymer resin can be present in the disclosed composition in an amount of at least 26, or at least 27, or at least 28, or at least 29, or at least 30, or at least 31 wt % based on the entire weight of the composition. The maximum amount of EEA present in the composition typically does not exceed 46, or does not exceed 45, or does not exceed 44, or does not exceed 43, or does not exceed 42, or does not exceed 41, wt % based on the entire weight of the composition.

The optional ethylene-based polymer of the disclosed composition is not an ethylene alkyl acrylate copolymer. The ethylene-based polymer of the disclosed composition can be an ethylene/α-olefin interpolymer, and further an ethylene/α-olefin copolymer. In some embodiments, the ethylene-based polymer can have 3 to 12 carbon atoms, or 3 to 8 carbon atoms. Examples of suitable α-olefin comonomers include propylene, 1-butene, 1-hexene, 4-methyl-1-pentene, and 1-octene.

The ethylene-based polymer can have a percent crystallinity of less than, or equal to, 45%, further less than, or equal to, 40%, further less than, or equal to, 30%, further less than, or equal to, 25%, and further less than, or equal to, 20%, as determined by DSC. Further, the ethylene-based polymer can have a percent crystallinity of greater than, or equal to, 0%, further greater than, or equal to, 2%, further greater than, or equal to, 5%, and further greater than, or equal to, 10%, as determined by DSC.

The ethylene-based polymer can have a polydispersity (Mw/Mn) in the range of 1.5 to 10.0. Mw is defined as weight average molecular weight, and Mn is defined as number average molecular weight. The ethylene-based polymer can have a density in the range of 0.86 to 0.96 g/cc. In an embodiment, the ethylene-based polymer can have a density of less than 0.93 g/cc, a melt index ($I_2$) of 1 to 10 g/10 min, and a polydispersity of 8.0 or less. In a further embodiment, the ethylene-based polymer can have a density of less than 0.90 g/cc, a melt index ($I_2$) of 1 to 10 g/10 min, and a polydispersity of 3.5 or less.

An example of an ethylene-based polymer suitable for use in compositions according to this disclosure includes, but is not limited to, the AFFINITY™ KC 8852G polyolefin plastomer available from The Dow Chemical Company. Other examples of ethylene-based polymer, interpolymers, and copolymers suitable for use according to this disclosure include the ultra-low molecular weight ethylene polymers described in U.S. Pat. Nos. 6,335,410, 6,054,544 and 6,723,810, each fully incorporated herein by reference. The ethylene-based polymer can also be a homopolymer of ethylene or an interpolymer of ethylene and a minor amount (i.e., less than 50 mole percent ("mol %")) of one or more α-olefins having from 3 to 20 carbon atoms, or from 4 to 12 carbon atoms, and, optionally, a diene.

The ethylene-based polymer can be present in the composition in an amount of at least 0, or at least 1, or at least 2, or at least 3, or at least 4, or at least 5, wt % based on the entire weight of the composition. The maximum amount of the ethylene-based polymer present in the composition typically does not exceed 15, or does not exceed 14, or does not exceed 13, or does not exceed 12, or does not exceed 11, or does not exceed 10, wt % based on the entire weight of the composition.

The optional coupling agent for use according to this disclosure is preferably obtained by modification of a polymer with a chemical compound containing an organo-functional group. In an embodiment, the polymer is a polyolefin, preferably a propylene resin or an ethylenic resin. An ethylenic resin is one wherein the primary monomer is ethylene. "Primary" means greater than 50 mole percent based on the amount of pre-polymerization monomers. Examples of organo-functional group containing chemical compounds suitable for modifying an ethylenic resin for use in compositions according to this disclosure include unsaturated carboxylic acids such as fumaric acid, acrylic acid, maleic acid, crotonic acid, and citraconic acid; unsaturated aliphatic diacid anhydrides such as maleic anhydride, itaconic anhydride, citraconic anhydride, 5-norbornene-2,3-dicarboxylic anhydride, 4-methyl cyclohexene-1,2-dicarboxylic anhydride, and 4-cyclohexene-1,2-dicarboxylic anhydride; epoxy compounds such as glycidyl acrylate, glycidyl methacrylate, and allyl glycidyl ether; hydroxy compounds such as 2-hydroxyethyl acrylic acid, 2-hydroxyethyl methacrylic acid, and polyethylene glycol mono-acrylate; metal salts such as sodium acrylate, sodium methacrylate, and zinc acrylate; silane compounds such as vinyl tri-chloro silane, vinyl tri-ethoxy silane, vinyl tri-methoxy silane, and methacryloxy propyl tri-methoxy silane.

The ethylenic resins, prior to modification, can have a melt index in the range of 0.1 to 50 g/10min and a density in the range of 0.86 to 0.96 g/cc. They can be any ethylene/α-olefin copolymer produced by conventional methods using Ziegler-Natta catalyst systems, Phillips catalyst systems, or other transition metal catalyst systems. Thus, the copolymer can be a very low density polyethylene ("VLDPE"), ultra low density polyethylene ("ULDPE"), a linear low density polyethylene ("LLDPE"), a medium density polyethylene ("MDPE") having a density in the range of 0.926 to 0.94 g/cc, or a high density polyethylene ("HDPE") having a density greater than 0.94 g/cc. These ethylenic resins also include such resins as high pressure low density polyethylene ("HP-LDPE", a homopolymer) or ethylene/a-olefin copolymers produced by employing single site metallocene catalysts. These ethylenic resins can be referred to generically as polyethylenes.

Modification of the ethylenic resin can be accomplished by, for example, the copolymerization of ethylene and maleic anhydride. The polymerization technique is a conventional high pressure polymerization of the underlying comonomers. Reference can be made to Maleic Anhydride, Trivedi et al, Polonium Press, New York, 1982, Chapter 3, section 3-2. This treatise also covers grafting.

In various embodiments, the coupling agent can be a maleic-anhydride-grafted polyethylene. In further embodiments, the coupling agent can be a maleic-anhydride-grafted polyolefin elastomer.

The organo-functional-group-containing chemical compound (e.g., maleic anhydride) can be present in the coupling agent in an amount ranging from 0.05 to 10, from 0.05 to 5, or from 0.1 to 2, parts by weight per 100 parts by weight of ethylenic resin.

The coupling agent, comprising ethylenic resin modified with an organo-functional group, can be present in the composition is an amount of at least 0, or at least 1, or at least 2, or at least 3, or at least 4, or at least 5, wt % based on the entire weight of the composition. The maximum amount of coupling agent present in the composition typically does not exceed 12, or does not exceed 11, or does not exceed 10, or does not exceed 9, or does not exceed 8, or does not exceed 7, wt % based on the weight of the composition.

Examples of antioxidants for use in compositions according to this disclosure include, but are not limited to, hindered and semi-hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. A commercial example of an antioxidant suitable for use according to this disclosure includes the IRGANOX™ 1010 antioxidant available from BASF SE.

The optional antioxidant can be present in the composition in an amount of at least 0, at least 0.1, or at least 0.2, wt % based on the entire weight of the composition. The maximum amount of the antioxidant present in the composition typically does not exceed 1.0, or does not exceed 0.7, or does not exceed 0.5, wt % based on the entire weight of the composition.

The components of the composition discussed above, i.e., the halogen-free flame retardant, the ethylene ethyl acrylate copolymer, the optional ethylene-based polymer, the optional coupling agent, and the optional antioxidant, can be combined with other conventional additives provided that the particular additive chosen will not adversely affect the composition.

For instance, the disclosed composition can further comprise a silicone-group containing compound present in the composition from 1 to 5 wt % that functions as a smoke suppressant. The silicone-group containing compound employed in the disclosure is exemplified by the following formula:

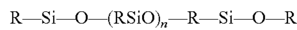

$$R—Si—O—(RSiO)_n—R—Si—O—R$$

in which each R is independently a saturated or unsaturated alkyl group, an aryl group, or a hydrogen atom, and n is 1 to 5000. Typical groups are methyl, ethyl, n-propyl, isopropyl, n-butyl, isobutyl, phenyl, or vinyl. The silicone oil can also be a glycidyl modified silicone oil, an amino modified silicone oil, a mercapto modified silicone oil, a polyether modified silicone oil, a carboxylic acid modified silicone oil, or a higher fatty acid modified silicone oil. The viscosity of the silicone oil can be in the range of from 0.65 to 1,000,000 centistokes at 25° C., from 5,000 to 100,000 centistokes, or from 10,000 to 100,000 centistokes. The silicone oil component can be used in an amount of 1 to 5% by weight in the formulation.

Other additives can be added to the composition prior to or during the mixing of the components, or prior to or during extrusion. These other additives include ultraviolet absorbers or stabilizers such as antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, additional flame retardant additives, and crosslinking boosters and catalysts. Additives can be added in amounts ranging from less than 0.1 to more than 5 parts by weight for each 100 parts by weight of the resin.

The disclosed composition may further comprise a carbon black masterbatch present in the composition in an amount of from 1 to 4 wt %, with the carbon black (in some instances) functioning primarily as a UV stabilizer. The carbon black masterbatch can be, for instance, DQNA-0013 carbon black masterbatch, which is an ethylene vinyl acetate carbon black (40%) masterbatch.

In an embodiment, the composition is thermoplastic. That is, one in which the various resins are not crosslinked to a point at which melt flow properties are impaired. This is typically assured by maintaining a gel content (measured by extraction in boiling decalin) below 30 wt %, preferably below 10 wt % and most preferably below 3 wt %.

The various resins can be crosslinked in a conventional manner, if desired. Crosslinking is usually accomplished with organic peroxide, examples of which are mentioned with respect to grafting. The amount of crosslinking agent used can be in the range of 0.5 to 4 parts by weight of organic peroxide for each 100 parts by weight of resin, and is preferably in the range of 1 to 3 parts by weight. Crosslinking can also be affected with irradiation or moisture, or in a mold, according to known techniques. Peroxide crosslinking temperatures can be in the range of 150 to 210° C. and are preferably in the range of 170 to 210° C.

The resins can also be made hydrolyzable so that they can be moisture cured. This is accomplished by grafting the resin with, for example, an alkenyl trialkoxy silane in the presence of an organic peroxide (examples are mentioned above), which acts as a free radical generator. Useful alkenyl trialkoxy silanes include the vinyl trialkoxy silanes such as vinyl trimethoxy silane and vinyl triethoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those mentioned above for crosslinking.

The composition can also be blended and kneaded using a BANBURY™ mixer, a HENSCHEL™ mixer, a kneader, a multi-screw extruder, or continuous mixer to obtain a uniformly compounded composition.

The resin composition can be mixed and a cable coated with the resin composition can be prepared in various types of extruders, some of which are described in U.S. Pat. Nos. 4,814,135, 4,857,600, 5,076,988, and 5,153,382. A variety of types of single screw and twin screw extruders and polymer melt pumps and extrusion processes will generally be suitable in effecting the process of this disclosure. A typical extruder, commonly referred to as a fabrication extruder, will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of 15:1 to 30:1.

As will be discussed below and illustrated in the Examples, the advantages of the composition according to the disclosure lie in mechanical properties superior to conventional products while still exhibiting essentially no emission of harmful gases such as halogen, and good stress/thermal resistance to cracking.

For instance, the composition according to the disclosure can exhibit tensile strength of at least 1,450 psi, or at least 1,480 psi, or at least 1,500 psi. Still further, the composition can exhibit tensile elongation of at least 300%, or at least 320%, or at least 340%. The exhibited unaged tensile properties of the composition can be determined according to ASTM D638 and ISO 527 testing procedures on compression molded specimens.

Further, the composition according to this disclosure can further exhibit limiting oxygen index of at least 28%, or at least 29%, or at least 30%. The exhibited limiting oxygen index of the composition can be determined according to ASTM D2863-00 testing procedures.

Still further, the composition according to this disclosure can further exhibit an average burn time after 10 seconds of flame of at least 200 seconds, or less than 200 seconds, or less than 100 seconds, or less than 50 seconds. The exhibited limiting average burn time after 10 seconds of flame of the composition can be determined according to UL 94 testing procedures.

Even further, the compositions according to this disclosure exhibit a fire propagation index ("FPI") greater than 0.35 $s.m^2/kW$. FPI is a measure of flame retardancy. Relatively higher FPI values indicate long ignition time and low heat release rate in burn. The FPI is calculated by the following equation, in which the time to ignition and max heat release rate are obtained by cone calorimeter by specified conditions (2 mm thick 100 mm×100 mm dimensional plaque in a holder with wire grid under heat flux of 35 $kW/m^2$).

$$\text{FPI}=\text{time to ignition}/\text{max heat release rate} \quad (1)$$

Average specific extinction area ("SEA"), with units of m2/kg, is another parameter obtained by cone calorimeter testing. The compositions according to this disclosure can exhibit average SEA less than 280 m2/kg, which is a measure of the instantaneous amount of smoke being produced per unit mass of specimen burned. Relatively lower average SEA indicates low smoke released in the burning.

Still further, the composition according to this disclosure can further exhibit a shear viscosity not to exceed 2,700 Pa s, or 2,500 Pa s, or 2,200 Pa s. The exhibited shear viscosity of the composition can be determined at 160° C. and 100 rad $s^{-1}$.

Even further, the composition according to this disclosure can further exhibit a relative viscosity, at 160° C. and stress of 16,000 Pa, not to exceed 4.0 or 3.5 or 3.0. Relative viscosity is computed as follows:

$$\eta_r=\eta_c/\eta_b \quad (2)$$

wherein $\eta_r$ is relative viscosity, $\eta_c$ is viscosity of filled compound at stress of about 16,000 Pa, $\eta_b$ is viscosity of base resin at stress of about 16,000 Pa.

EXAMPLES 1-3 OF THE DISCLOSURE

Comparative Examples ("CE") 1-3 and Illustrative Examples ("IE") 1-3 are based on EEA copolymer resin. In the Examples, the EEA copolymer resin is commercially available under the tradename AMPLIFY EA 100 from The Dow Chemical Company. CE4-CE9 are counterpart examples with the same amount of fillers respectively based on an ethylene vinyl acetate ("EVA") copolymer resin blend having a melt index similar to that of the EEA used. In the Examples, the EVA copolymer resin blend is a 1:1 blend of resins commercially available under the tradenames ELVAX 3165 and ELVAX 3170 from E. I. du Pont de Nemours and Company. Table 1 illustrates the basic properties of the EEA copolymer resin and the EVA copolymer resin blend. The blend melt index was deduced from the melt indexes of individual components (0.7 g/10 min for ELVAX 3165 and 2.5 for ELVAX 3170 g/10 min) according to the following equation:

$$Lg[\text{MFI of blend}]=W_1\times Lg[\text{MFI}_1]+W_2\times Lg[\text{MFI}_2] \quad (3)$$

in which $W_1$ and $W_2$ are the weight percentages of polymers 1 and 2, respectively, $MFI_1$ and $MFI_2$ are the melt indexes of polymers 1 and 2, respectively.

TABLE 1

Basic Properties of EEA Resin and EVA Resin Blend.

| | Melt Index @ 190° C./2.16 kg | Comonomer Content % |
|---|---|---|
| EEA Copolymer Resin | 1.3 | 15.0 |
| EVA Resin Blend | 1.3 | 18.0 |

The raw materials in the Examples are weighted according to the formulation in Table 2 and added into a brabender measuring bowl at 160° C. The raw materials are added to the bowl in sequence from the top of Table 2 to the bottom of Table 2. After all the raw materials are added, the materials are mixed for an additional 5 minutes at 40 rpm to achieve a uniform mixture. When compounding is completed, the compounded material is compressed into plaques at 145° C. (3 minutes at 500 psi, plus 3 minutes at 25,000 psi) with different thicknesses for tests. In particular, Limiting Oxygen Index ("LOI") and UL94 flame tests are conducted on a 125 mil plaque, while T&E and dynamic oscillatory shears are tested on a 50 mil plaque. The volume percent of mineral fillers is calculated by the following equation:

$$(W_{A1}/\rho_{A1}+W_{Mg}/\rho_{Mg}+W_{Ca}/\rho_{Ca})\times\rho_c \quad (4)$$

wherein $W_{A1}$, $W_{Mg}$, $W_{Ca}$ are the weight percent of aluminum hydroxide, magnesium hydroxide, and calcium carbonate in composition, and $\rho_{A1}$, $\rho_{Mg}$, $\rho_{Ca}$, $\rho_c$ are the density of aluminum hydroxide, magnesium hydroxide, calcium carbonate, and compound, respectively.

TABLE 2

Formulation of IE1-IE3 and CE1-CE9.

| | CE1 | CE2 | IE1 | IE2 | IE3 | CE3 |
|---|---|---|---|---|---|---|
| EEA Copolymer Resin (AMPLIFY ™ EA 100) | 19.9 | 23.1 | 27.1 | 31.1 | 35.1 | 39.1 |
| Ethylene-Based Polymer (AFFINITY ™ KC 8852G) | 10.2 | 10.2 | 10.2 | 10.2 | 10.2 | 10.2 |
| Coupling Agent (AMPLIFY ™ GR 216) | 6.8 | 6.8 | 6.8 | 6.8 | 6.8 | 6.8 |
| Flame Retardant (Aluminum Hydroxide (>99.4%)) | 49.1 | 46.5 | 43.3 | 39.7 | 36.7 | 33.3 |

TABLE 2-continued

| Formulation of IE1-IE3 and CE1-CE9. | | | | | | |
|---|---|---|---|---|---|---|
| Flame Retardant (Magnesium Hydroxide (>99%)) | 4.9 | 4.6 | 4.2 | 4.0 | 3.5 | 3.2 |
| Flame Retardant (Calcium Carbonate, Stearate-coated) | 4.9 | 4.6 | 4.2 | 4.0 | 3.5 | 3.2 |
| Antioxidant (IRGANOX ™ 1010) | 0.2 | 0.2 | 0.2 | 0.2 | 0.2 | 0.2 |
| Silicone Oil, 60,000 cSt | 1.5 | 1.5 | 1.5 | 1.5 | 1.5 | 1.5 |
| DQNA-0013 BK | 2.5 | 2.5 | 2.5 | 2.5 | 2.5 | 2.5 |
| Total wt. % | 100.0 | 100.0 | 100.0 | 100.0 | 100.0 | 100.0 |
| Mineral Filler Volume Fraction | 0.360 | 0.330 | 0.296 | 0.264 | 0.234 | 0.205 |
| | CE4 | CE5 | CE6 | CE7 | CE8 | CE9 |
| EVA Copolymer Resin (ELVAX ™ 3170) | 9.9 | 11.5 | 13.5 | 15.5 | 17.5 | 19.5 |
| EVA Copolymer Resin (ELVAX ™ 3165) | 10.0 | 11.6 | 13.6 | 15.6 | 17.6 | 19.6 |
| Ethylene-Based Polymer (AFFINITY ™ KC 8852G) | 10.2 | 10.2 | 10.2 | 10.2 | 10.2 | 10.2 |
| Coupling Agent (AMPLIFY ™ GR 216) | 6.8 | 6.8 | 6.8 | 6.8 | 6.8 | 6.8 |
| Flame Retardant (Aluminum Hydroxide (>99.4%)) | 49.1 | 46.5 | 43.3 | 39.7 | 36.7 | 33.3 |
| Flame Retardant (Magnesium Hydroxide (>99%)) | 4.9 | 4.6 | 4.2 | 4.0 | 3.5 | 3.2 |
| Flame Retardant (Calcium Carbonate, Stearate-coated) | 4.9 | 4.6 | 4.2 | 4.0 | 3.5 | 3.2 |
| Antioxidant (IRGANOX ™ 1010) | 0.2 | 0.2 | 0.2 | 0.2 | 0.2 | 0.2 |
| Silicone Oil, 60,000 cSt | 1.5 | 1.5 | 1.5 | 1.5 | 1.5 | 1.5 |
| DQNA-0013 BK | 2.5 | 2.5 | 2.5 | 2.5 | 2.5 | 2.5 |
| Total wt % | 100.0 | 100.0 | 100.0 | 100.0 | 100.0 | 100.0 |
| Mineral Filler Volume Fraction | 0.360 | 0.330 | 0.296 | 0.264 | 0.234 | 0.205 |

TABLE 3

| Performance of IE1-IE3 and CE1-CE9. | | | | | | |
|---|---|---|---|---|---|---|
| | CE1 | CE2 | IE1 | IE2 | IE3 | CE3 |
| Base Polymer | 19.9 wt % EEA | 23.1 wt % EEA | 27.1 wt % EEA | 31.1 wt % EEA | 35.1 wt % EEA | 39.1 wt % EEA |
| Tensile Strength - Peak Stress (psi) | 1614 | 1565 | 1518 | 1497 | 1505 | 1409 |
| Tensile Elongation (%) | 236 | 258 | 327 | 363 | 408 | 393 |
| LOI (%) | 41 | 41 | 36 | 33 | 29 | 28 |
| UL94 average burn time after 10 seconds flame on 125 mil plaque (sec) | 0 | 5 | 3 | 82 | >200 | >200 |
| Shear Viscosity at 160° C. and 10 rad $s^{-1}$ (Pa s) | 1.6E4 | 1.4E4 | 6880 | 7440 | 7400 | 7220 |
| Shear Viscosity at 160° C. and 100 rad $s^{-1}$ (Pa s) | 4280 | 3790 | 1900 | 2070 | 2070 | 2040 |
| Relative Viscosity at 160° C. | 6.47 | 5.68 | 2.88 | 3.00 | 2.92 | 2.80 |
| | CE4 | CE5 | CE6 | CE7 | CE8 | CE9 |
| Base Polymer | 19.9 wt. % EVA | 23.1 wt % EVA | 27.1 wt % EVA | 31.1 wt % EVA | 35.1 wt % EVA | 39.1 wt % EVA |
| Tensile Strength - Peak Stress (psi) | 1646 | 1544 | 1441 | 1416 | 1336 | 1316 |
| Tensile Elongation (%) | 261 | 293 | 294 | 390 | 427 | 412 |
| LOI (%) | 42 | 36 | 37 | 35 | 30 | 26 |
| UL94 average burn time after 10 seconds flame on 125 mil plaque (sec) | 0 | 1 | 2 | 145 | 121 | >200 |
| Shear Viscosity at 160° C. and 10 rad $s^{-1}$ (Pa s) | 1.5E4 | 1.4E4 | 1.2E4 | 9310 | 8030 | 7340 |
| Shear Viscosity at 160° C. and 100 rad $s^{-1}$ (Pa s) | 4030 | 3850 | 3330 | 2600 | 2270 | 2070 |
| Relative Viscosity at 160° C. | 8.65 | 8.17 | 7.00 | 5.42 | 4.67 | 4.27 |

As illustrated in Table 3, IE1-IE3 exhibit balanced mechanical properties in comparison with CE1-CE9. Namely, IE1-IE3 enables tensile elongation greater than 300% while achieving tensile strength greater than 1,450 psi. These mechanical properties have not been previously achieved using compositions comprising alternative EEA compositional ranges (i.e., <27% or greater than 36%), such as CE1-CE3, or EVA, such as CE4-CE9.

In addition, the unique relative viscosity characteristics (less than or equal to 4) at 160° C. and about 16,000 Pa stress of IE1-IE3 are indicative of improved processability during extrusion, relative to the comparative examples, while retaining LOI greater than or equal to 28% and tensile strength greater than or equal to 1,450 psi. This is clearly shown in FIG. 1, which indicates the variation of relative viscosity at constant shear stress with filler volume fraction for the illustrative and comparative examples.

EXAMPLES 4-6 OF THE DISCLOSURE

The following masterbatch composition is made using a twin-screw extruder: 20.5 wt % EEA Amplify™ EA 100, 10.5 wt % AFFINITY™ KC 8852G resin, 7 wt % AMPLIFY™ GR 216 Functional Polymer, 50 wt % Aluminum Hydroxide, 5 wt % Magnesium Hydroxide, 5 wt % Calcium Carbonate, 1.5 wt % silicone oil (60,000 cSt), 0.3 wt % Stearic Acid, and 0.2 wt % Antioxidant IRGANOX™ 1010. This composition is used to make the compositions of IE4-IE6, CE10, and CE11, employing the procedures described below.

The composition is weighted according to the formulation in Table 4 and added into the brabender bowl at 160° C., the adding sequence is from the top of Table 4 to the bottom of Table 4. The resulting amounts of individual components are shown in Table 4. After all the raw materials are added, the materials are mixed for an additional 5 minutes at 40 rpm to achieve a uniform mixture. When compounding is completed, the compounded material is compressed into plaques at 145° C. (3 minutes at 500 psi, plus 3 minutes at 25,000 psi) with different thicknesses for tests. In particular, LOI and UL94 flame tests are conducted on a 125 mil plaque, while T&E and dynamic oscillatory shears are tested on a 50 mil plaque.

TABLE 4

Formulations of IE4-IE6, CE10, and CE11.

| | CE10 | CE11 | IE4 | IE5 | IE6 |
|---|---|---|---|---|---|
| EEA (Amplify ™ EA 100) | 0 | 4.6 | 9.6 | 14.6 | 19.6 |
| Masterbatch Composition | 97.5 | 92.9 | 87.9 | 82.9 | 77.9 |
| DQNA-0013 BK | 2.5 | 2.5 | 2.5 | 2.5 | 2.5 |
| Total wt. % | 100.0 | 100.0 | 100.0 | 100.0 | 100.0 |
| Resulting Formulations | | | | | |
| Base Polymer: EEA Copolymer Resin (AMPLIFY ™ EA 100) | 19.9 | 23.1 | 27.1 | 31.1 | 35.1 |
| Ethylene-Based Polymer (AFFINITY ™ KC 8852G) | 10.2 | 9.8 | 9.3 | 8.7 | 8.1 |
| Coupling Agent (AMPLIFY ™ GR 216) | 6.8 | 6.5 | 6.2 | 5.8 | 5.5 |
| Flame Retardant (Aluminum Hydroxide (>99.4%)) | 48.8 | 46.8 | 44.3 | 41.9 | 39.4 |
| Flame Retardant (Magnesium Hydroxide (>99%)) | 4.9 | 4.7 | 4.4 | 4.2 | 3.9 |
| Flame Retardant (Calcium Carbonate, Stearate-coated) | 4.9 | 4.7 | 4.4 | 4.2 | 3.9 |
| Antioxidant (IRGANOX ™ 1010) | 0.2 | 0.2 | 0.2 | 0.2 | 0.2 |
| Silicone Oil, 60,000 cSt | 1.5 | 1.4 | 1.3 | 1.2 | 1.2 |
| Stearic Acid, 100% | 0.3 | 0.3 | 0.3 | 0.2 | 0.2 |
| DQNA-0013 BK | 2.5 | 2.5 | 2.5 | 2.5 | 2.5 |
| Total wt. % | 100.0 | 100.0 | 100.0 | 100.0 | 100.0 |
| Mineral Filler Volume Fraction | 0.358 | 0.328 | 0.294 | 0.262 | 0.232 |

TABLE 5

Performance of IE4 To IE6, CE10, and CE11.

| | CE10 | CE11 | IE4 | IE5 | IE6 |
|---|---|---|---|---|---|
| Tensile Strength - Peak Stress (psi) | 1701 | 1708 | 1705 | 1671 | 1674 |
| Tensile Elongation (%) | 263 | 306 | 333 | 348 | 401 |
| LOI (%) | 45 | 38 | 37 | 32 | 28 |
| UL94 average burn time after 10 seconds flame on 125 mil plaque (sec) | 0 | 0 | 2 | 5 | 10 |
| Ignition Time by Cone Calorimeter (s) | 104 | 99 | 85 | 83 | 80 |
| Max Heat Release Rate by Cone Calorimeter ($kW/m^2$) | 203 | 223 | 218 | 213 | 221 |
| Mean Specific extinction area by Cone Calorimeter ($m^2/kg$) | 205 | 250 | 252 | 259 | 271 |
| FPI by Cone Calorimeter ($s \cdot m^2/kW$)) | 0.51 | 0.44 | 0.39 | 0.39 | 0.36 |

TABLE 5-continued

| Performance of IE4 To IE6, CE10, and CE11. | | | | | |
|---|---|---|---|---|---|
| | CE10 | CE11 | IE4 | IE5 | IE6 |
| Shear Viscosity at 160° C. and 10 rad $s^{-1}$ (Pa s) | 1.2E4 | 1.05E4 | 8.79E3 | 8.34E3 | 6.44E3 |
| Shear Viscosity at 160° C. and 100 rad $s^{-1}$ (Pa s) | 3150 | 2790 | 2340 | 2250 | 1770 |
| Relative Viscosity at 160° C. | 4.85 | 4.24 | 3.57 | 3.43 | 2.69 |

As illustrated in Table 5, 1E4-1E6 exhibit balanced mechanical properties in comparison with CE10 and CE11. Namely, 1E4-1E6 enables tensile elongation greater than 330% while achieving tensile strength greater than 1,650 psi. These mechanical properties have not been previously achieved using compositions comprising alternative EEA compositional ranges (i.e., <27% or greater than 36%), such as CE10 and CE11.

What is claimed is:

1. A composition comprising:

42 to 54 percent by weight of a halogen-free flame retardant;

26 to 46 percent by weight of an ethylene alkyl acrylate copolymer;

1 to 15 percent by weight of an ethylene-based polymer;

0 to 12 percent by weight of a coupling agent;

0 to 1.0 percent by weight of an antioxidant; and 1 to 5 parts by weight of a silicone oil for each 100 parts by weight of the composition, wherein the composition exhibits a tensile elongation greater than 300%, a tensile strength greater than 1,450 psi, and a relative viscosity at 160° C. and stress of 16,000 Pa, not to exceed 4.0.

2. The composition of claim 1, wherein the halogen-free flame retardant is selected from the group consisting of aluminum hydroxide, magnesium hydroxide, calcium carbonate, and combinations of two or more thereof.

3. The composition of claim 1, wherein the ethylene-based polymer comprises subunits derived from ethylene and from $C_3$ through $C_{12}$ α-olefins.

4. The composition of claim 3, wherein the ethylene-based polymer has a melt index ($I_2$) of 1 to 10 g/10 min.

5. The composition of claim 3, wherein the ethylene-based polymer has a density of 0.86 to 0.96 g/cc.

6. The composition of claim 1, wherein the coupling agent is a maleic-anhydride grafted polymer.

7. The composition of claim 1, wherein the antioxidant is selected from the group consisting of hindered and semi-hindered phenols, phosphites and phosphonites, thio compounds, siloxanes, amines, and combinations of two or more thereof.

8. The composition of claim 1, further comprising 0.1 to 5 parts by weight for each 100 parts by weight of the composition of at least one additive selected from the group consisting of ultraviolet absorbers or stabilizers, antistatic agents, pigments, dyes, nucleating agents, resistivity modifiers, slip agents, plasticizers, processing aids, lubricants, viscosity control agents, tackifiers, anti-blocking agents, surfactants, extender oils, metal deactivators, voltage stabilizers, fillers, additional flame retardant additives, and crosslinking boosters and catalysts, and combinations of two or more thereof.

9. The composition of claim 1, further comprising 1 to 4 parts by weight of an ultraviolet stabilizer for each 100 parts by weight of the composition.

10. A cable insulation layer, comprising the composition of claim 1.

11. A cable protective outer jacket, comprising the composition of claim 1.

12. A cable core sheath, comprising the composition of claim 1.

13. A cable comprising an electrical conductor and a communications media, wherein at least one of the electrical conductor and communications media is surrounded by a sheath comprising the composition of claim 1.

* * * * *